Figure 1:
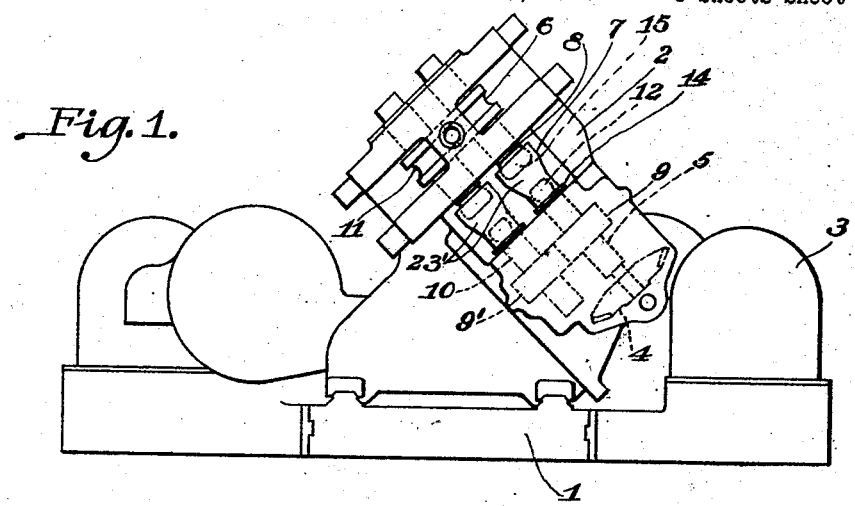

March 30, 1926.  1,578,664

H. C. INSLEE

WABBLER

Filed March 26, 1924  3 Sheets-Sheet 1

WITNESSES

INVENTOR
Heber C. Inslee

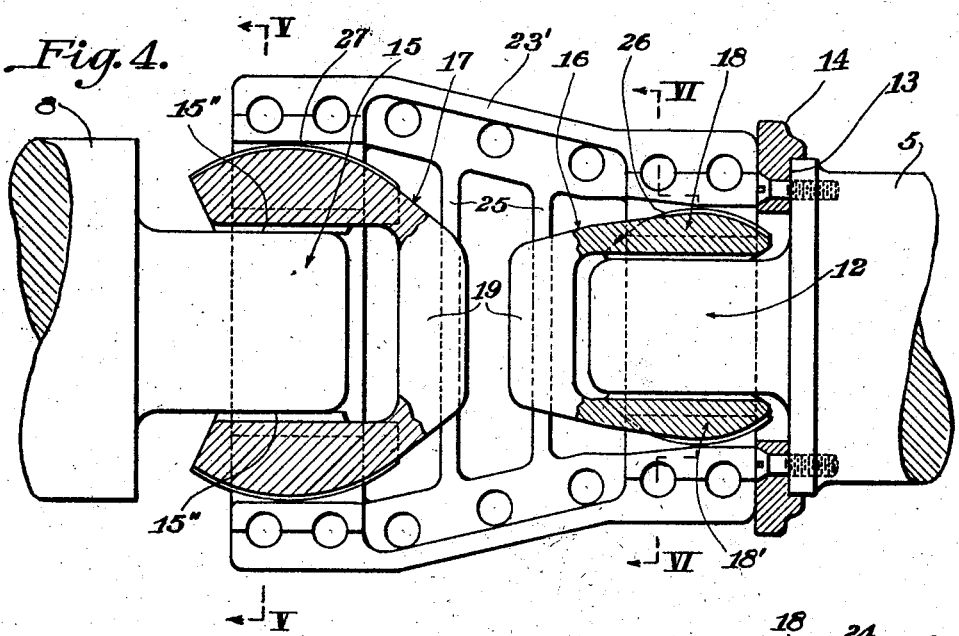
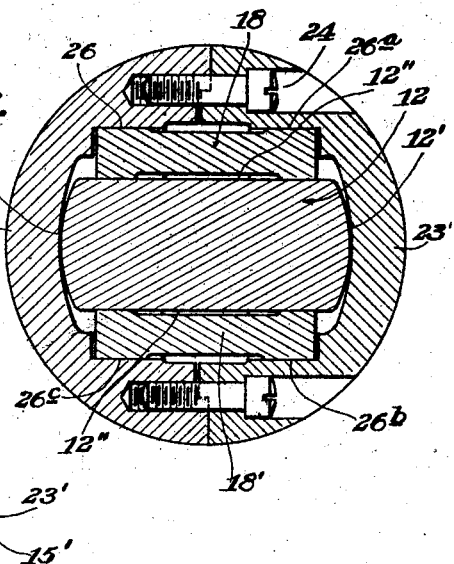
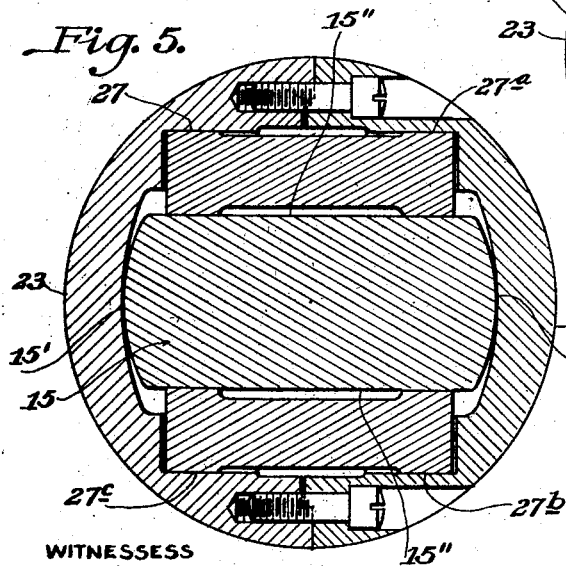

March 30, 1926.  1,578,664

H. C. INSLEE

WABBLER

Filed March 26, 1924  3 Sheets-Sheet 3

WITNESSES  INVENTOR

Patented Mar. 30, 1926.

1,578,664

UNITED STATES PATENT OFFICE.

HEBER CLYDE INSLEE, OF ROSELLE, NEW JERSEY, ASSIGNOR TO THE BABCOCK & WILCOX COMPANY, OF BAYONNE, NEW JERSEY, A CORPORATION OF NEW JERSEY.

WABBLER.

Application filed March 26, 1924. Serial No. 701,980.

*To all whom it may concern:*

Be it known that I, HEBER C. INSLEE, a citizen of the United States, and a resident of Roselle, in the county of Union and State of New Jersey, have invented a new and useful Improvement in Wabblers, of which the following is a specification.

This invention relates generally to means for operatively connecting a rotating driving element to a rotatably driven one, and particularly to the type known as wabblers.

Wabblers are commonly used in rolling mills for operatively joining and transmitting motion from the rotating shafts of the roll stand to the rolls associated therewith, and due to the fact that the relative position between the roll and its driving shaft is ever-varying, the wabbler for connecting the two must be capable of permitting such changes in relative position while at the same time assuring an effective driving action. Besides changes in the angular relation between the roll and its shaft, various adjustments change their relative position longitudinally of each other, consequently the wabbler must accommodate itself and properly function under all of these conditions. Heretofore, in order to secure the necessary accommodation referred to, the ends of the wabbler connected to the driving shaft and the roll shaft have engaged the same with a very loose fit, and the changes in the relative position of the parts permitted by the lost motion existing therebetween. On account of this lost motion, the mills so equipped have been necessarily quite noisy, with considerable wear on the wabbler, and have required additional power to operate under these conditions. These disadvantages, although objectionable with the smaller mills, become pronounced in installations of mills of large size.

It is an object of this invention to provide a wabbler overcoming the disadvantages noted above, in which the lost motion and wear between the parts is reduced to a minimum, which will operate with comparatively little noise, and one which will readily accommodate itself to the ever-varying relation between the driving and driven parts without the consumption of excessive power.

It is also an object to provide a wabbler of this character which is simple and durable in construction, which can be manufactured at a reasonable cost, which may be easily machined, assembled and disassembled, which is highly efficient in operation, and which is capable of driving efficiently with much less than the usual distance between the driving and driven members by reason of the fact that the coupling axis can be at a more acute angle to the axis of driving and driven shafts.

These and other objects of the invention will more fully appear when taken in conjunction with the following description and the appended claims.

Figure 2:
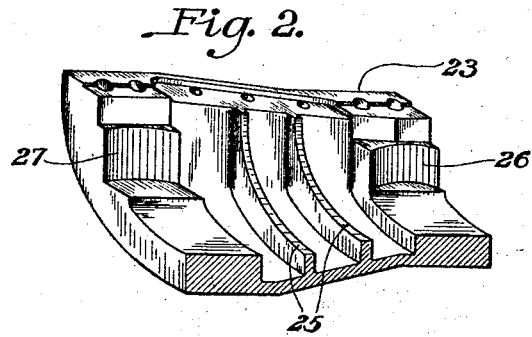
Figure 3:
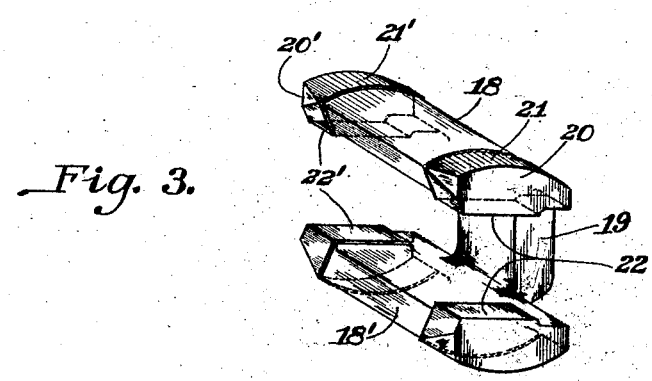
Figure 7:
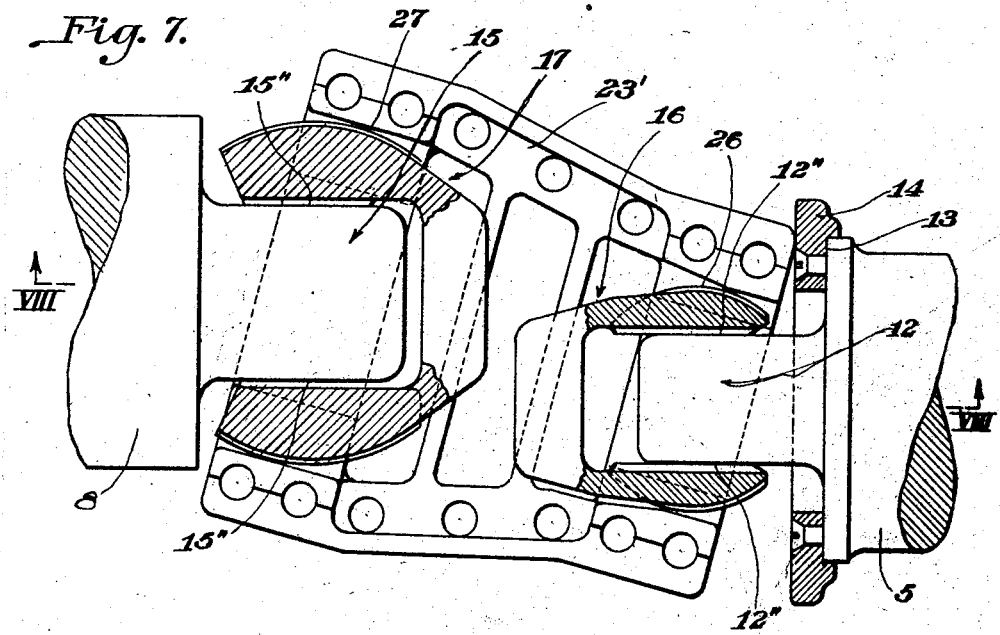

In the accompanying drawings, Fig. 1 is a diagrammatic view of a portion of a rolling mill in which the several roll stands are inclined to each other, showing the application of the wabbler forming the subject of this invention applied to one of the stands; Fig. 2 a fragmentary view, in perspective, showing the internal structure of the wabbler cap or casing; Fig. 3 a perspective view of one of the yokes; Fig. 4 a fragmentary sectional view, with parts in elevation, showing the cooperation of the wabbler with the driving and driven shafts, with the axes of the shafts disposed in alignment; Fig. 5 a transverse sectional view taken substantially on the line V—V of Fig. 4; Fig. 6 a similar view taken on the line VI—VI of Fig. 4; Fig. 7 a view corresponding to Fig. 4 in which the axes of the shafts are off-set; and Fig. 8 a fragmentary sectional view taken substantially on the line VIII—VIII of Fig. 7.

Fig. 1 of the drawings illustrates the application of the wabbler forming the subject of this invention to one of the stands of a rolling mill, the supporting bed plate of which is designated at 1, the frame of the roll stand at 2, and its driving motor at 3. The motor 3 is operatively connected through any suitable gearing to the pinion 4 connected at one end of the driving shaft 5 for the roll 6, and a wabbler indicated generally at 7, corresponding to this invention, is interposed between the extremity of the roll shaft 8 and the upper extremity of the driving shaft 5. As illustrated, the driving shaft 5 carries a gear 9 which meshes with a similar gear 9' fixed to the driving shaft 10 associated with the remaining roll 11, and the shaft 10 and the roll shaft 11 are likewise operatively connected by a wabbler corresponding to wabbler 7.

The parts thus far described have been illustrated merely for the purpose of disclosing the application and use of the invention in one environment, and for the purpose of more clearly setting forth its mode of operation. It is obvious from Fig. 1, that power is transmitted from the driving shafts 5 and 10 to the pair of rolls 6 and 11 through the intervention of the wabblers disposed between the driving shafts and the roll shafts, similar to the manner commonly employed with wabblers of well known types now upon the market.

The extremity of the driving shaft 5 is provided with a slightly reduced partially spherical head 12 forming an integral part of the shaft, and due to the comparative sizes of the head and the main portion of the driving shaft forms a shoulder as indicated at 13. The opposite sides 12' of the head 12 are spherically curved, while the opposite faces 12'' disposed in a plane at right angles to that of the plane of the surfaces 12' form flat bearing surfaces, the entire head being somewhat elongated in cross section as clearly shown in Fig. 6. Fixed to the extremity of the shaft 5, and attached to the shoulder 13 which forms a seat therefor, is a ring 14 serving as a limiting stop or abutment for the wabbler cap or casing in a manner presently to be described in greater detail.

The extremity of the roll shaft 8 is formed as a head 15 similar to the head 12 of the driving shaft 5, with the exception of the shoulder 13, being provided with the oppositely disposed spherically curved surfaces 15' and the oppositely disposed flat surfaces 15''.

Cooperating with the extremities of both the driving shaft and the roll shaft is a U-shaped yoke, the yoke associated with the driving shaft being indicated generally at 16, and that associated with the roll shaft at 17. Both of these yokes are identical in construction, varying only in size, and it will therefore be necessary to describe in detail but one of them.

The details of the yoke are clearly illustrated in Fig. 3 of the drawings. The yoke as a whole is substantially U-shaped, the leg portions of which are in the form of elongated lugs 18, 18' connected at their centers by means of a bridge piece 19. The ends of the lugs are slightly enlarged as at 20, 20', having their outer surfaces 21, 21' cylindrically curved, and their inner surfaces 22, 22' flat, with one of the flat surfaces disposed upon the opposite side of the enlarged portion of the lug from each of the cylindrically curved surfaces. All of these surfaces are intended as bearing surfaces and are suitably machined for this purpose, and in order to make definite their leverage about the yoke center, the portion intermediate the enlargements 20, 20' is purposely made slightly smaller in cross-section. Both legs of the yoke are similarly formed with the flat bearing surfaces disposed upon the inner side and the cylindrically curved surfaces upon the outer side.

The wabbler cap is in the form of a split tubular casing comprising the sections 23, 23' which are held in assembled relation by a plurality of bolts such as shown at 24. In the form illustrated in the drawings, this casing is somewhat larger at the end adjacent the roll shaft than at its opposite end, corresponding to the differences in size between the yokes 16 and 17. It is understood, however, that such difference in size between the opposite ends is not an essential of the invention, and is merely incidental to the variation in size of the two yokes employed in the construction illustrated.

The casing may be strengthened by the employment of internal annular ribs such as indicated at 25, if desired, and the inner wall thereof is similarly constructed at each end with suitable bearing surfaces for the purpose of anchoring the yokes for rocking movement in a single plane, without danger of longitudinal displacement, and for cooperation with the spherically curved portions at the extremities of the shafts to permit rocking movement between the casing and shafts while at the same time preventing relative lateral movement therebetween.

As illustrated in Fig. 2, the inner wall of the casing is provided with a cylindrically curved bearing surface 26 which is adapted to cooperate with the curved surface 21' on the yoke 16, and the opposite enlarged end of the casing is likewise provided with the cylindrically curved surface 27 which coacts in a similar manner with the curved surface on the yoke 17 lying in abutting relation therewith. For the purpose of simplicity, but one quarter of the entire inner surface of the casing has been illustrated, as in Fig. 2, it being understood, however, that four cylindrically curved bearing surfaces are provided at each end of the casing for cooperation with the four cylindrically curved bearing surfaces on each of the yokes. The relative disposition of the cylindrically curved bearing surfaces upon the interior of the casing at the smaller end thereof is clearly shown in Fig. 6 of the drawings, these surfaces being indicated respectively at 26, 26$^a$, 26$^b$ and 26$^c$, likewise, the relative disposition of the several cylindrically curved bearing surfaces at the enlarged end of the casing is shown in Fig. 5 and indicated respectively at 27, 27$^a$, 27$^b$ and 27$^c$.

The yokes 16 and 17 may be readily positioned within the wabbler cap or casing upon separation of the two sections 23, 23', which when bound into intimate contact, as illustrated in Figs. 5 and 6 of the drawings, will positively anchor the yokes within the casing, operatively connect the same, prevent relative longitudinal movement with respect to the casing, while at the same time permitting free rocking movement of the yokes within the casing in a single plane, that is in the plane of the paper, as viewed in Figs. 4 and 7.

The distance between the flat bearing surfaces 12″ corresponds to the distance between the flat bearing surfaces 22 and 22′ of the yoke, and the diameter of the partial sphere formed by the curved surfaces 12′ is substantially equal to the diameter of the opening at the end of the casing. The size of head 15 at the extremity of the roll shaft corresponds in like manner to the dimensions between the flat surfaces of the yoke 17 and the size of the opening at the adjacent end of the casing. Due to the cooperation between the opposite flat bearing surfaces of the shaft extremities with the inner bearing surfaces of the yokes, longitudinal sliding movement between the shafts and the yokes is readily permitted, and the cooperation therebetween together with the coaction between the curved portions of the extremities with the casing also permit rocking movement of the headed extremities of the shafts within the casing. Due to the neat fit between the several bearing surfaces, the sliding movement as well as the rocking movement, both between the yokes and casing and between the headed extremities of the shaft and the casing, takes place with substantially no lost motion between the contacting parts.

When the wabbler is employed for operatively connecting shafts, such as 5 and 8, which are inclined to the horizontal, the lower end of the wabbler cap or casing rests against the ring 14, and is limited in its downward travel thereby, so as to maintain the several parts within their proper limits for effective operation.

Figure 8:
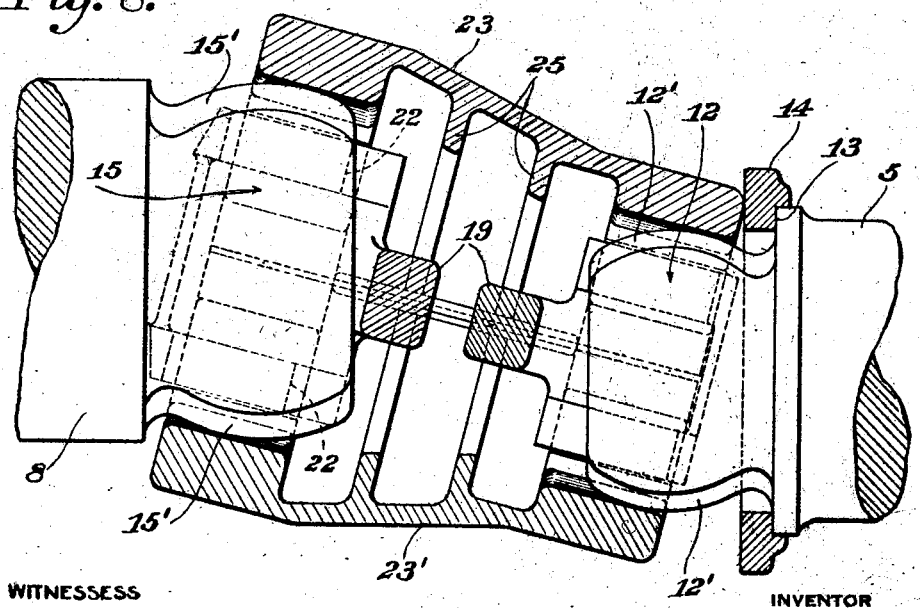

In Fig. 4 the driving shaft 5 and the roll shaft 8 have been shown with their axes in longitudinal alignment and the various relative positions which the several parts assume under these conditions have been illustrated therein. Figs. 7 and 8 illustrate the same parts, showing the relative positions assumed thereby when these shafts are off-set from each other.

In operation, power is applied through any suitable gearing to the driving shaft 5. Rotation of the driving shaft in turn transmits its motion to the yoke 16, the wabbler cap or casing, the yoke 17, and the roll shaft 8 to the driven roll. Due to the fact that the yokes are free to rock within the casing in one plane, while the headed extremities of the shafts are free to rock within the yokes in a plane at right angles to the first named plane, it is apparent that the motion of the shaft 5 will be readily transmitted to the shaft 8 regardless of any variation in their angular relation, the wabbler functioning under these conditions in the nature of a universal connection. Because the headed extremities of the shafts are also free to slide longitudinally of the casing within the yokes, motion is transmitted from the driving shaft to the driven shaft regardless of changes in their relative longitudinal disposition within the limits for which the wabbler is designed.

It is particularly pointed out that all of the contacting portions between either the shafts and the yokes, or the yokes and the casing, are always in intimate contact, being provided at these points with suitably machined bearing surfaces, consequently, the entire functioning of the wabbler, irrespective of the nature of the changes and relative disposition between the parts, takes place without any lost motion, and assures a smooth and comparatively quiet operation.

As required by the Patent Statutes, the preferred embodiment of the invention has been illustrated and described in detail, but it is obvious that many changes in construction and association of the several parts may be made without departing from the spirit of the invention, and is therefore not intended to limit the invention beyond that particularly set forth and defined by the appended claims.

I claim:

1. The combination of a driving shaft, a driven shaft, a yoke slidably and rockably engaging each of said shafts, a casing operatively connecting the yokes and anchoring the same against longitudinal displacement, the said yokes being mounted for rotative movement within the said casing, and a ring fixed to one of said shafts in alignment with the said casing whereby to limit longitudinal movement thereof.

2. The combination of a driving shaft, a driven shaft, the extremities of each of said shafts being elongated in cross-section, and provided with bearing surfaces, a yoke slidably and rockably engaging each of said extremities and provided with bearing surfaces cooperating with bearing surfaces on the said shafts, and a casing operatively connecting the said yokes, said yokes being rotatably mounted in the casing, the interior of the casing and exterior of the yokes having curved bearing surfaces, the bearing surfaces on the casing and yokes cooperating to permit rotative but prevent longitudinal movement of the yokes within the casing.

3. The combination of a driving shaft, a driven shaft, the extremities of each of said shafts being partially spherical in shape and elongated in cross-section, a U-shaped yoke slidably engaging each of said extremities, and a casing for operatively connecting the said yokes, said yokes being mounted for rocking movement but anchored against longitudinal movement within the said casing, the curved portions of said extremities abutting the interior wall of the casing.

4. The combination of a driving shaft, a driven shaft, the extremities of each of said shafts being partially spherical in shape, elongated in cross-section and provided with flat bearing surfaces at its opposite sides, a U-shaped yoke associated with each of said extremities having inner surfaces cooperating with the said flat bearing surfaces whereby to mount the yokes for longitudinal sliding and free rocking movement in a single plane upon the shafts, the said yokes being also provided with outer cylindrically curved bearing surfaces, a casing operatively connecting the said yokes and having cylindrically curved bearing surfaces upon its inner face cooperating with the outer bearing surfaces on the yokes whereby to mount the yokes for rocking movement only within the casing, the curved portions of said extremities abutting the wall of the casing to prevent relative lateral movement therein.

5. A flexible coupling comprising a hollow casing, a pair of U-shaped yokes rotatably anchored within the casing, the entire space between the jaws of said yokes being unobstructed, said casing connecting said yokes and maintaining the axes thereof at a predetermined fixed distance from each other, a driving shaft operatively engaging one of said yokes, and a driven shaft operatively engaging the remaining yoke, the extremities of said shafts being elongated in cross section and projecting within the interior of the said casing.

In testimony whereof, I sign my name.

HEBER CLYDE INSLEE.